United States Patent [19]
Jonsson

[11] Patent Number: 5,054,999
[45] Date of Patent: Oct. 8, 1991

[54] FLOW MACHINE

[75] Inventor: Arne F. Jonsson, Hagfors, Sweden

[73] Assignee: Jonsson Pumpkonsult, Hagfors, Sweden

[21] Appl. No.: 469,552

[22] PCT Filed: Sep. 21, 1988

[86] PCT No.: PCT/SE88/00489
§ 371 Date: Mar. 23, 1990
§ 102(e) Date: Mar. 23, 1990

[87] PCT Pub. No.: WO89/02974
PCT Pub. Date: Apr. 6, 1989

[30] Foreign Application Priority Data
Sep. 25, 1987 [SE] Sweden ............... 8703294.2

[51] Int. Cl.$^5$ ............................. F03D 11/04
[52] U.S. Cl. ................................. 416/204 R
[58] Field of Search ........... 416/104, 111, 119, 131, 416/135, 140, 153, 178, 187, 196 R, 197 A, 204 R

[56] References Cited

U.S. PATENT DOCUMENTS

| 955,289 | 4/1910 | Scott | 416/197 A X |
| 1,835,018 | 12/1931 | Darrieus | 416/111 |
| 4,105,363 | 8/1978 | Loth | 416/111 X |
| 4,183,715 | 1/1980 | Ducker | 418/104 X |
| 4,255,085 | 3/1981 | Evans | 416/178 X |
| 4,299,537 | 11/1981 | Evans | 416/119 |
| 4,430,044 | 2/1984 | Liljegren | 416/119 |
| 4,435,124 | 3/1984 | Zheng | 416/140 R X |
| 4,555,218 | 11/1985 | Jonsson et al. | 416/17 |

FOREIGN PATENT DOCUMENTS

| 0046122 | 7/1985 | European Pat. Off. . |
| 2745862 | 4/1979 | Fed. Rep. of Germany ... 416/197 A |
| 604390 | 5/1926 | France . |
| 8400002 | 7/1984 | PCT Int'l Appl. . |
| 2040363 | 8/1980 | United Kingdom ............ 416/119 |

Primary Examiner—Edward K. Look
Assistant Examiner—James A. Larson
Attorney, Agent, or Firm—Herbert Dubno; Yuri Kateshov

[57] ABSTRACT

A flow machine includes a recess formed on at least one of the envelope faces of the blade and receiving an attachment assembly having an insert member introduced therein and forming a bound engagement between side faces thereof and side walls of the recess, the insert member is pivotally connected with a support arm extending radially from a rotor shaft rotatably about an axis of rotation so as the blade is capable of adjusting transversely to the axis of rotation.

10 Claims, 3 Drawing Sheets

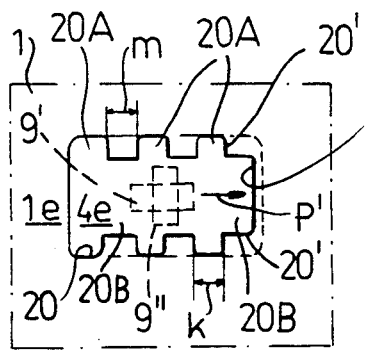
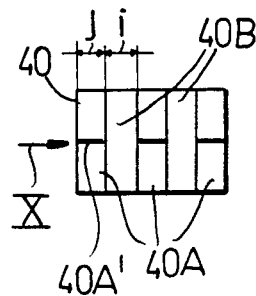
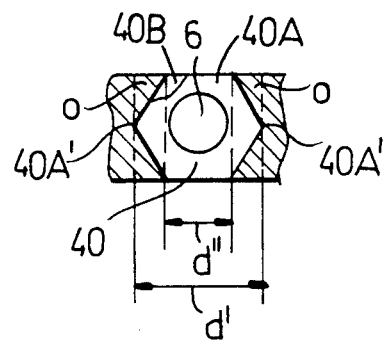
FIG.8   FIG.9   FIG.10
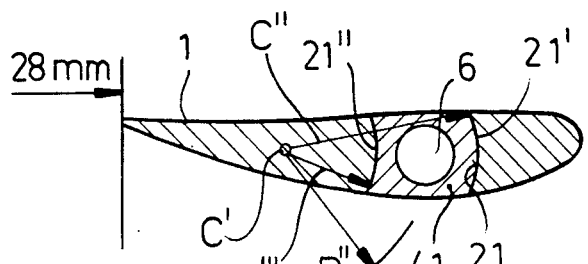
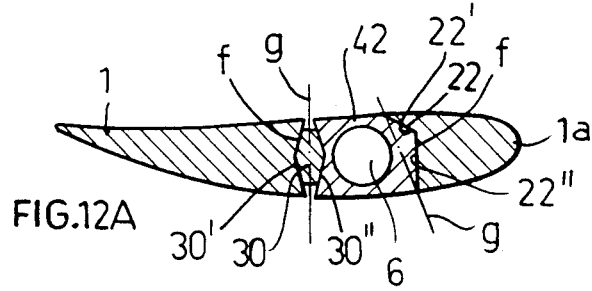
FIG.11   FIG.12A
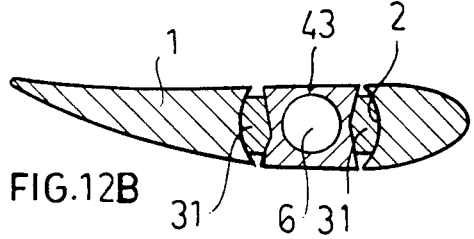
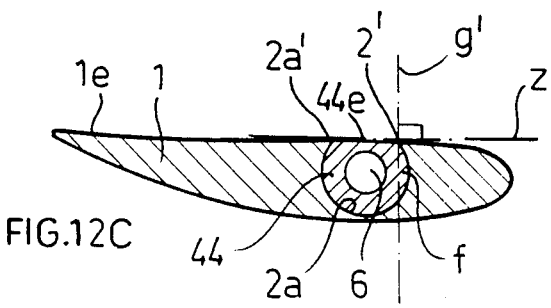
FIG.12B   FIG.12C

FLOW MACHINE

CROSS-REFERENCE TO RELATED APPLICATIONS

This application is a national phase application corresponding to PCT/SE88/00489 filed Sept. 21, 1988 and based, in turn, upon an application filed in Sweden as 8703294.2 filed Sept. 25, 1988 under the International Convention.

FIELD OF THE INVENTION

The present invention relates to a flow machine and, more particularly, to a flow machine provided with a device for attachment of an adjustable blade element having an airfoil shape cross-section.

BACKGROUND OF THE INVENTION

A blade adjustment is one of the cardinal problems of any type of flow machine affecting equally a structural strength correlated with an operation of the machine at high speeds, safety of a structure and flow losses. A few principal structures of the flow machine are known. Axial machines with radial, non-adjustable blades, for instance, steam turbines, utilize a so-called fur top attachment meeting high operational demands as a result of a form-locking engagement. Hydraulic turbines, for example, Kaplan-type propeller turbine, utilize adjustable blades providing high efficiency and methods for adjusting the blades are known. Generally, blades are attached outside the flow area of medium driving an actual blade. However, design problems often arise when ,under certain circumstances, a blade should be attached within the flow area causing high flow losses.

In machines characterized by the medium flowing transversely to a blade of the machine, so called transverse flow machines, the blade attachment gains particular significance when such a machine is provided with a small number of blades.

The FRENCH patent 604,390 describes the importance of a stream line shape for the blades in a so called Darrius-rotor. Rotor blades in the transverse machines are exposed to a varying load causing a fatigue effect. Due to the high density of liquid, structural strength of the blade attachment gains a critical role for an entire structure. Particularly, designing a structure of the blade attachment, not only the operational speed, but also a run away speed, attained by a turbine upon interrupting of the breaking moment of a generator, should be taken into consideration.

In hydraulic turbines the run away speed is twice as high as the operational speed. Considering the influence of centrifugal forces, the ratio between the run away and operational speed is even larger rendering the run away speed to be approximately four times as high as the operational speed.

This phenomena affects detrimentally the machines with adjustable blades attached to an insert element during an operation by increasing the wear of the blades. As a result, additional structural demands are brought to both a structure of the insert element and sealing connections thereof preventing penetration of pollutants carried by the medium.

The known structures of a pivot element negatively affects the structure as well. As known in the art, a blade length with known blade attachments is to be extended at more than 20% of the blade length. As a consequence, the blade effectiveness is decreased at more that 30%.

OBJECTS OF THE INVENTION

It is therefore an object of the present invention to provide an improved blade attachment.

Another object is the provision of such an improved blade attachment for a hydraulic turbine which overcomes the above-given disadvantages, that is reducing the wear of the blade upon improving sealing connections and configuration of the insert element.

SUMMARY OF THE INVENTION

According to the invention a flow machine includes:

a rotor rotatable about an axis of rotation;

at least one support arm mounted nonrotatably on the rotor and extending radially from the axis, the arm being formed with a free end spaced from the rotor;

at least one pin operatively connected with the free end and pivotal about a pivot axis parallel to the axis of rotation;

a surface formed by a straight line generatrix moved about an airfoil shape closed path parallel to the pivot axis;

a body formed with the surface and having a longitudinal axis coplanar with the pivot axis, the surface forming an envelope of the body defining:

a leading edge and a trailing edge, an inner envelope face facing the shaft and an outer envelope face opposite the inner envelope face, the envelope faces extending between the leading and trailing edges;

an elongated recess formed in the body and opening at the inner envelope face, said recess spaced between the edges and receiving the pin being formed with:

a first and second side walls spaced from one another and extending from the inner envelope face toward the outer envelope face, at least one of the side walls being recessed and having a nadir located at a distance from the respective edge;

a first and second end walls spaced axially apart and extending between the side walls;

an insert member mounted on the pin in the recess and being formed with:

a first side face and a second side face confronting the first and second side walls of the recess, a first end face and a second end face juxtaposed respectively with the first and second end walls of the recess, an outer limiting face bridging the side and end faces and lying in the envelope of said body, and at least one locking element formed with a pair of spaced apart side flanks juxtaposed respectively with one of the side wall and with the side face and being complementary therewith upon introducing the insert member into the recess.

Thus, an attachment point of the blade is located inside the cross-section area and the assembly does not, practically, affect the flow while ensuring a structural strength of the construction. The fatigue strength my be very high as a result of a low notch fatigue factor. The pivot center may be located along the longitudinal axis as well as along the axis transverse the longitudinal one provided that the location is optimal relative to a force applied to the blade?

DESCRIPTION OF THE DRAWING

The above and other objects, features, and advantages will become more readily apparent from the following, reference being made to the accompanying drawing in which:

FIG. 8 is a sectional view of another embodiment of the insertion member according to the invention as applied to FIG. 3.

FIG. 9 is a plan view of the insertion member according to FIG. 8;

FIG. 10 is a side view of the insertion member according to FIG. 8;

FIG. 11 is a perspective sectional view of another embodiment according to the invention taken along line II—II of FIG. 1 of the blade;

FIG. 12A is a perspective sectional view of still another embodiment according to the invention taken along line II—II of FIG. 1 of the blade.

FIG. 12B is a perspective sectional view of still another embodiment according to the invention taken along line II—II of FIG. 1 of the blade;

FIG. 12C is a perspective sectional view of still another embodiment according to the invention taken along line II—II of FIG. 1 of the blade.

SPECIFIC DESCRIPTION

Figure 1:
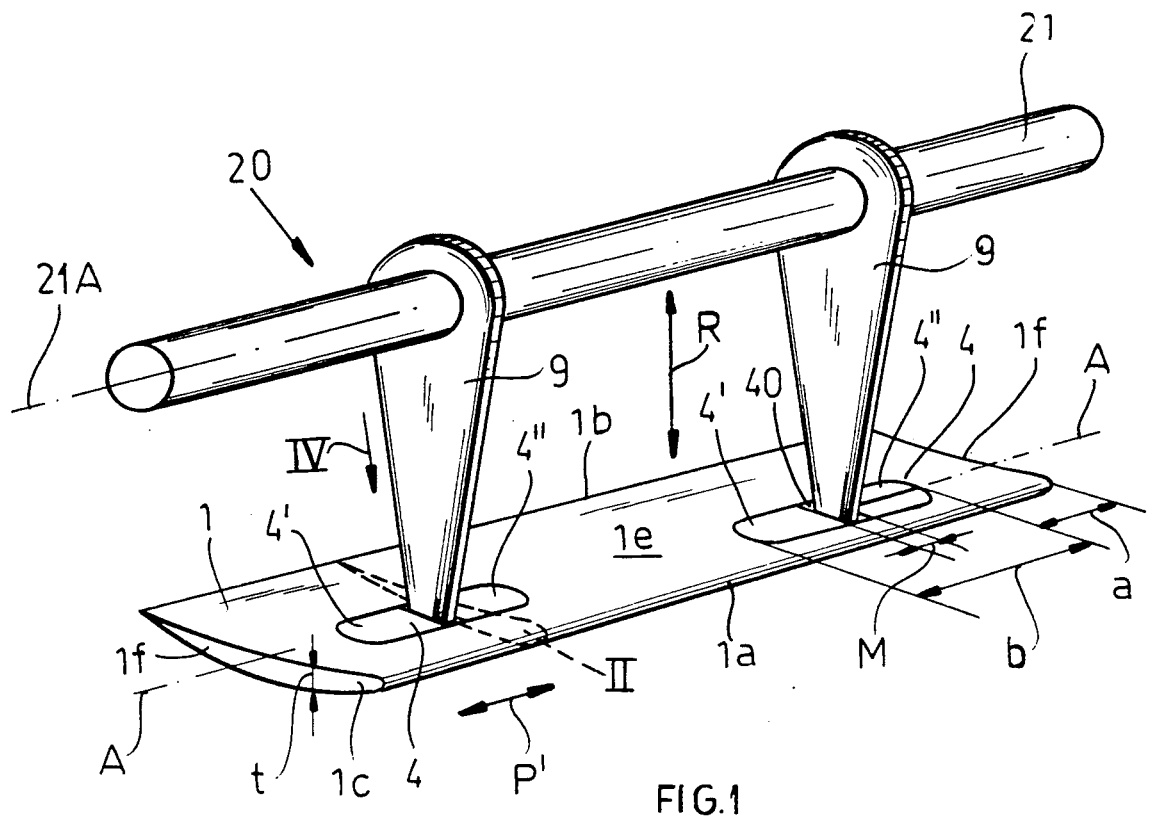
FIG. 1 is a perspective view of a rotor of the flow machine with a blade attached thereto and assembled according to the present invention.

As shown in FIG. 1 a rotor 20 of the flow machine is provided with a shaft 21 rotatable about an axis of rotation 21' and with a pair of support members or arms 9 extended radially therefrom and carrying respective elongated blades I extending generally in a plane parallel to the axis 21A. Only one blade is shown in FIG. 1.

The blade 1 supported by the arms 9 is radially spaced from the shaft at a distance R. The arms mounted on the shaft are rotatably fixed therewith and are pivotal about a longitudinal axis A—A of the blade. A relative inclination between the arms and the blade may be regulated by any suitable and well-known means and the blade can be fixed in any desirable position during rotation of the rotor.

The blade has a drop-shaped profile resembling an airplane wing and formed with a thickness t and is provided with two end faces 1f, an inner envelope face 1e and with an opposite face 1d remote from the shaft. The envelope faces 1e and 1d extend from a leading edge 1a and are tapered toward a trailing edge 1b of the blade.

Figure 2:
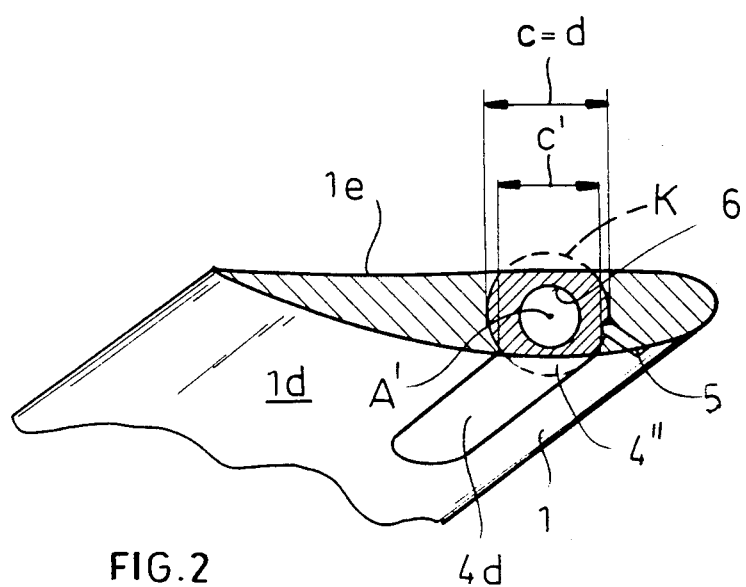
FIG. 2 is a perspective sectional view taken along line II—II of FIG. 1 of the blade.

The portion 1c of the blade having the maximum thickness is provided with a pair of elongated recesses 2 formed at a selected distance a from the respective face end 1f as shown in FIG. 2. Each of the recesses is delimited by respective concave side walls 2a and 2b having a common center of curvature K and extends axially at a selected length b along an axis A' coplanar with the axis A—A of the blade as illustrated in FIG. 3.

Figure 3:
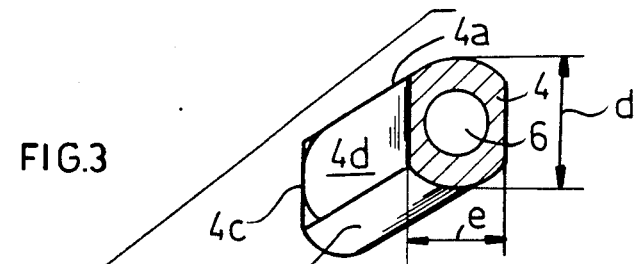
FIG. 3 is an exploitee perspective sectional view taken along line II—II of FIG. 1.
Figure 4:
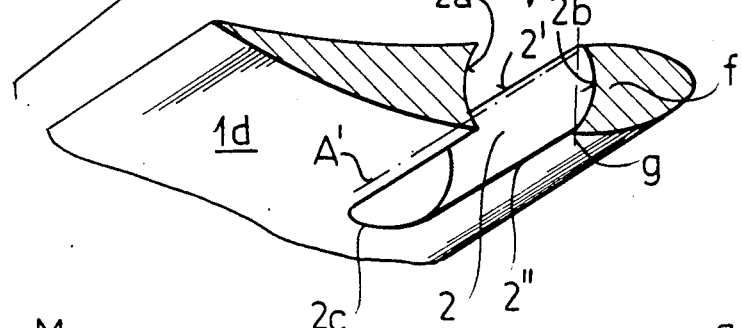
FIG. 4 is a plan sectional view taken along line IV—IV of FIG. 1.
Figure 4:
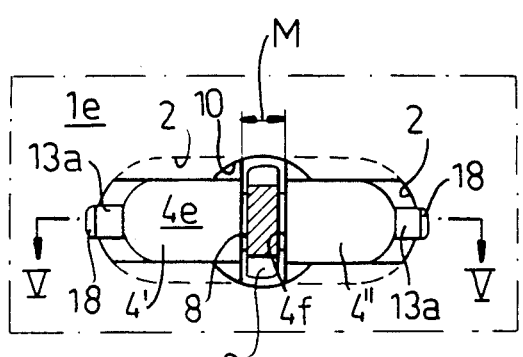
Figure 5A:
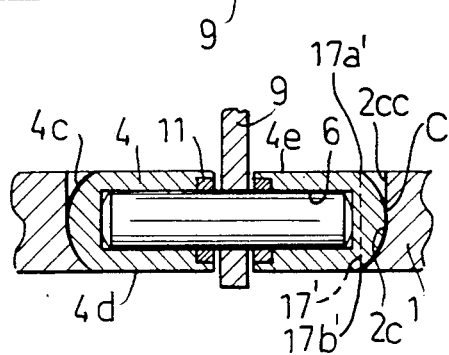
FIG. 5A is a sectional view of a first embodiment of the attachment assembly according to present invention taken along line V—V of FIG. 4.
Figure 7:
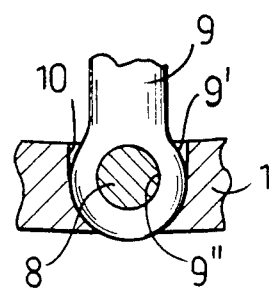
FIG. 7 is a section taken along line VII—VII of FIG. 5B.
Figure 5B:
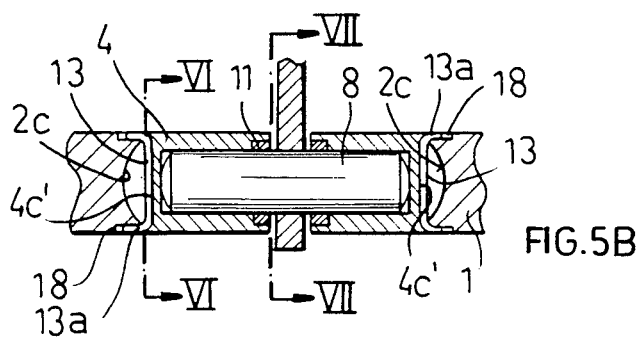
FIG. 5B is a sectional view of a second embodiment of the attachment assembly according to present invention taken along line V—V of FIG. 4.
Figure 5C:
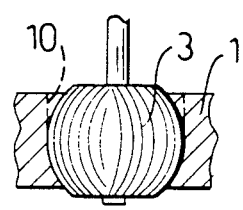
FIG. 5C is a cutter for producing a recess according to the invention.

The recesses may be produced by a cutter 3 shown in FIG. 5C and having a spherical or toroidal cutting face introduced into the blade 1 through an inlet opening 10 best seen in FIGS. 4 and 7 and further shifted axially approximately at a distance 0.5b in opposite directions forming thereby opposite concave spherical end faces 2c of the respective recess as illustrated in FIG. 3.

Each of the recesses 2 receives respective halves 4, 4" of an insert member 4 separated from one another by an axial gap M illustrated in FIG. 4 and provided with an axially extending bore 6 receiving a pivot pin 8 rotatably fixing the halves to one another. Each of the halves 4' and 4" is formed with a respective side face 4a, two outer limiting faces 4d and 4e, and with a respective outer end face 4c and an opposite inner face end 4f. The side faces 4a of the member spaced from one another at a distance d equal to a maximum distance c between nadirs of the recessed side walls 2a and 2b and are complementary therewith as shown in FIG. 2.

The respective outer limiting face 4d and 4e of each halve lie in the surface of the blade formed by a straight line generatrix moved about an airfoil shape closed path parallel to the pivot axis A' and form a continuous spherical surfaces of the respective envelope face with surrounding portions of the outer and inner envelope faces 1d and 1e in the final position of the insert member as shown in FIG. 2, 11 and 12. The inner limiting face 4e is spaced from respective outer limiting face 4d at a distance e which is identical to the thickness of the respective area of the blade and is necessary for the respective portions of the envelope faces and of the insert member be flushed. The distance e is smaller than the smallest distance c' between side walls of the recess 2a and 2b as clearly seen in FIG. 3.

Concerning the inner and outer end faces, the shape of cross-section of the latter may be either complementary with end faces of the recess 2c, i.e to have a convex spherical surface, as illustrated in FIG. 5A or, as shown in FIG. 5B, may be flat as well as the inner end faces 4f. In the former embodiment, the outer end faces are spaced axially from one another at the distance b between respective faces of the recess as shown in FIG. 1.

The gap M formed between two inner flat end faces 4f of the halves receiving a free end of the arm 9 formed with an eye 9' provided with an opening 9" as seen in FIG. 7 and pivotally mounted on the pivot pin 8. As an alternative variant, the pin 8 can be mounted pivotally with the arm 9 fixed rotatably on the pin.

The method of introduction of the insert into the blade is relatively simple. Initially, the member 4 is inserted into the recess 2 with the outer limiting face extending transversely the outer and inner envelope faces 1e and 1d of the blade in the direction P indicated in FIG. 3. following the insertion, the member is turned at approximately 90° to the engaged position shown in FIG. 2 characterized by the fact that inner and outer limiting faces 4d and 4e lie in the surface of the blade and may form continuous surfaces with the surrounding surfaces of the envelope faces 1e and 1d of the blade. In order to achieve a locking effect between the member and the blade it is necessary that at least one of the side walls be formed with the surface f between edges 2', 2", formed on the opposite envelope faces 1e, 1d upon recessing of the blade, is spaced further from the opposite side wall of the recess than the reference straight line g connecting the edges. Specific design of the insert element, as described above, provides the necessary mutual distance between the inner and outer limiting faces 4e, 4d of the member which is sufficient for such introduction. The engagement between the member and the blade is ensured either by friction since the face 4a of the member adjacent to the wall 2b has a complementary shape and as a result of a predetermined extent of fitting or by means of a locking element, for example, a pin 5 illustrated in FIG. 2. As an alternative variant, a locking plate, described in detail herebelow, can be utilized. Such engagement is also highly reliable because the torque affecting the blade is not significant around an area of the blade adjacent the axis A—A.

The form-bound engagement between the member 4 and the blade 1 is, foremost, conditioned by the specific configuration of the respective side faces 4a of the member and side walls of the recess 2a and 2b. Returning now to FIG. 3, it becomes crystal clear that at least one of the side walls 2a, 2b is formed with the convex spherical surface extending between opposite edges 2', 2" and having the region f spaced from the reference line g shown in dash lines.

Consequently, the member 4 should be held in the engagement position by friction as a result of a direct form-bound engagement between side walls and faces of the recess and insert member, or, alternatively, the side faces 4a are engaged with an additional locking element inserted between the side faces and walls and being complementary to the side walls 2a of the recess and to the side face 4a of the member. The latter will be fully described herebelow.

For the complete lock-formed engagement of the insert member, it would be sufficient to provide the outer end faces 4c of the member with a convex cross-section corresponding to the concave spherical surface of the end faces 2c of the recess 2 and cut away into flat surfaces 2c or, at least, into a concave cylindrical surface shown in FIG. 4, 5A and having a radius different from the spherical portion of the end face 2c but, nevertheless, sufficient for insertion of the member into the recess.

Figure 6:
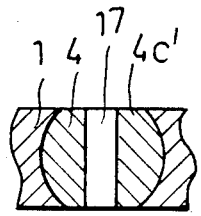
FIG. 6 is a section taken along line VI—VI of FIG. 5B.

FIG. 5B, 6 illustrate another embodiment of the insert member differing from the above-described member by the flat outer end face 4c' provided with respective locking plates 13 formed with a pair of flanges 13a received in the respective slots 18 produced in the envelope faces 1d and 1e of the blade. At least one of the flanges is bent upon complete insertion of the member into the recess. Modification of the axial engagement is shown in FIG. 5A illustrating the passages 17 produced in the spherical shape of the end face 4c. Opposite ends 17'a and 17'b of passage define a chord therebetween to the arc C. Such connection allows not only a reliable locking effect, but also good axial stabilization of the insert member.

As a pollutant-preventing measure, seals 11 shown in FIG. 5A, 5B for the pivot pin 8 are provided at inner end faces 4f of the insert member 4.

Another embodiment of the insert member 40 is illustrated in FIGS. 8-10. The insert member is introduced into the recess 20 produced in the blade and locked by an axial movement indicated by arrow P' shown in FIG. 1.

The insert member 40, shown in FIG. 9, 10 comprises three regions 40A having a hexagonal cross-section alternating with two regions 40B with a rectangular cross-section. Each region 40B is limited by respective pair of straight side walls spaced from one another at a distance d". Regions 40A of the side face are formed with a respective pair of flanks converging toward one another and forming a respective apex 40A'. The distance d' between apexes is greater than the distance d" of the region 40B as clearly seen in FIG. 10.

The recess 20 with a profile shown in FIG. 8 is formed with a mouth 21 opening at one of the envelope faces 1e, 1d defined by the an edge 20' and is composed by zones 20B provided with the width corresponding to that one d" of the regions 40B of the insert member and by zones 20A alternating with zones 20B and formed with the respective width corresponding to the maximum width d' of the regions 40A, so as zones 20B are narrower than zones 20A.

The length of the regions 40A and 40B, respectively j and i, may be the same. The length k of the zone 20A is, at least, equal to the length j of the region 40A, while the length of the zone 20B is identical to a length i of the region 40B. Such structures of the recess and insert member provide accommodation of the regions 40A of the insert member 40 produced simply by cutting off portions o of the side walls of the blade limited by dash lines as illustrated in FIG. 10.

The insert member is introduced into the recess 20 by receiving regions 40A and 40B by respective zones 20A and 20B.

The other way of introduction is when a distance a shown in FIG. 1 is zero and the end 1f is recessed so that the insert member is axially displaced in the direction P' at a distance equal to the distance m in a position corresponding to a locking position in which regions of the insert member are secured in corresponding zones of the recess forming a form-bound engagement therebetween. Thereafter, the insert member is axially fixed by any conventional means in order to prevent a possible axial displacement in the initial position of insertion.

Apparently, the exact shape of the side wall of the regions 40A may be varied as long as the engagement between the member and the envelope faces of the blade is provided. Thus, it would be possible to utilize the structure including several regions formed with convex cylindrical walls provided, of course, that the side walls of the recess 20 should be complementary.

The arm 9 can be mounted on the insert member identically to the way described with respect to embodiment shown in FIG. 1-7, i.e the member includes two halves interconnected by a pin introduced into the bore 6. The other possibility is when the support arm 9 is simply welded to the outer surface of the insert member as indicated at 9' in FIG. 8. The last structure would be suitable in case of non-adjustable blades and structurally would differ from the former case by the fact that the recess and the insert member may extend perpendicular to the longitudinal direction of the blade as indicated at 9" in FIG. 8. The bore 6 becomes obsolete in case of the non-adjustable blade.

FIG. 11 shows an embodiment of the assembly according to the present invention having side walls 21', 21" of the recess as well as side faces of the insert member 41 formed with the spherical surfaces complementing one another and arcuate in the same direction. Radii C''', C'' of the concentric respective surfaces are different and are extended from the common center C'' located in the blade beyond the area of the recess. The introduction of the insert member 41 is accomplished in the direction P'' along an arcuate path defined by opposite spherical side walls 21', 21'' of the recess. In case when of the end walls lies in the surface of the blade, i.e when the distance a is zero, the center should be located on the end 1f of the blade (FIG. 1). This structure is less advantages than the structure shown in FIG. 8 since an axial introduction of the member 41 would not be such time consuming.

FIG. 12A illustrates a structure according to the present invention having the insert member 42 introduced into the recess 22 formed with the side wall 22 provided with two flanks 22' and 22'' converging toward one another and defining the region f spaced from the leading edge 1a at a distance smaller than the reference line g connecting opposite edges 2', 2'a extending along the envelope faces and produced upon recessing. The insert member is, in turn, formed with a side face complementing the side wall 22 and with the opposite side face spaced from the respective side wall of the recess and connected thereto by means of the locking member 30. The locking member has opposite side walls 30', 30'' which are complementary with the side wall of the recess and insert member. The geometrical prerequisite requiring the resistant engagement between the insert member and recess in previously discussed embodiments is fully met by this structure.

Embodiment shown in FIG. 12B has two locking members 31 connecting opposite side faces of the insert member 43 with respective side walls of the recess 2. Respective pair of the opposite side walls of each locking member is complementary to the respective adjacent side walls and faces of the insert member and recess.

The structure illustrated in FIG. 12C includes an insert member 44 introduced into a recess 2A produced only in one of the envelope face of the blade 1 and not penetrating at the full thickness thereof. The insert member is formed with a cylindrical periphery and therefore has only two end edges 2' and 2'a extending axially along the envelope face 1e horizontally perpendicular to the tangent z to the envelope face 1e and vertically perpendicular to the reference line g'. In this embodiment the complementary shape of the periphery of the insert member and the periphery of the recess is again critical for the reliable locking engagement of the insert member having only one outer face 44e.

As a rule, embodiments shown in FIG. 12A-12C require that the distance a be zero and that locking elements be so dimensioned that, in the engaging position, they would produce a wedge action thereby locking the insert member in the recess.

I claim:

1. A flow machine comprising:
a shaft rotatable about an axis of rotation;
at least one support arm mounted nonrotatably on said shaft and extending form said axis, said arm being formed with a free end spaced from said shaft;
at least one pin operatively connected with said free end and having a pivot axis rotatable about said axis of rotation;
a surface formed by a straight line generatrix moved about an airfoil shape closed path around said pivot axis;
a body formed with said surface and having a longitudinal axis coplanar with said pivot axis, said body being pivotal about said pivot axis, said surface forming an envelope of said body defining a leading and trailing edge and an inner envelope face facing said shaft and an outer envelope face opposite said inner envelope face, said envelope faces extending between said leading and trailing edges, said body being formed with an elongated recess opening at said inner envelope face and receiving said pin, said recess being spaced between said edges and being formed with:
first and second side walls spaced from one another and extending from said inner envelope face toward said outer envelope face, at least one of said side walls being recessed and having nadir located at a distance from a respective one of said trailing and leading edges of the body;
an insert member mounted on said pin in said recess and being formed with:
a first side face and a second side face confronting said first and second side walls of said recess, and
an outer limiting face bridging said side faces, at least one of said side faces of said insert member being complementary with said side wall formed with the nadir and said outer limiting face lying in said envelope of the body upon engaging said member in said recess.

2. A flow machine comprising:
a shaft rotatable about an axis of rotation;
at least one support arm mounted nonrotatably on said shaft and extending from said axis, said arm being formed with a free end spaced from said shaft;
at least one pin operatively connected with said free end and having a pivot axis rotatable about said axis of rotation;
a surface formed by a straight line generatrix moved about an airfoil shape closed path around said pivot axis;
a body formed with said surface and having a longitudinal axis coplanar with said pivot axis, said body being pivotal about said pivot axis, said surface forming an envelope of said body defining:
a leading edge and a trailing edge, and
an inner envelope face facing said shaft and an outer envelope face opposite said inner envelope face, said envelope faces extending between said leading and trailing edges, said body being formed with an elongated recess opening at said inner envelope face and receiving said pin, said recess being spaced between said edges and being formed with:
a first and second side walls spaced from one another and extending from said inner envelope face toward said outer envelope face, at least one of said side walls being recessed and having a nadir located at a distance from the respective one of said trailing and leading edges of said body;
at least one first end wall extending between said side walls;
an insert member mounted on said pin in said recess and formed with:
a first side face and a second side face confronting said first and second side walls of said recess,
a first end face and a second end face spaced axially apart, said first end face being juxtaposed with said first end wall of said recess, an outer limiting face bridging said side and end faces lying in said envelope of the body, and at least one locking element formed with a pair of spaced apart side flanks juxtaposed respectively with one of the side wall and with the side face and being complementary therewith upon introducing the insert member into said recess.

3. The flow machine defined in claim 2, wherein the first and second side walls of said recess extend between said inner and outer envelope faces, said one side wall being a rearwardly concave spherical side wall.

4. The flow machine defined in claim 2, wherein said side walls of said recess are cylindrical.

5. The flow machine defined in claim 2 wherein said end faces of said insert member are axially convex, said first end wall being formed with a curved part running into a straight part traversing said inner envelope faces of the blade, said curved part of the first end wall and said first end faces being complementary.

6. The flow machine defined in claim 2 wherein said side walls are spaced from one another at a distance sufficient for said insert member to be inserted in said recess, said insert member being turned approximately at 90° angle in a position corresponding to juxtaposition of said flanks of said locking element with the respective side face and side wall.

7. A flow machine comprising:
a shaft rotatable about an axis of rotation;
at least one support arm mounted nonrotatably on said shaft and extending from said axis, said arm being formed with a free end spaced from said shaft;
at least one pin operatively connected with said free end and having a pivot axis rotatable about said axis of rotation;
a surface formed by a straight line generatrix moved about an airfoil shape closed path around said pivot axis;
a body formed with said surface and having a longitudinal axis coplanar with said pivot axis, said body being pivotable about said pivot axis, said surface forming an envelope of said body defining:
a leading edge and a trailing edge, and
an inner envelope face facing said shaft and an outer envelope face opposite said inner envelope face, said envelope faces extending between said leading and trailing edges, said body being formed with an elongated recess opening at said inner envelope face and receiving said pin, said recess being spaced between said edges and being formed with:
first and second side walls spaced from one another and extending from said inner envelope face toward said outer envelope face, at least one of said side walls being formed with a first straight side region uniformly spaced from the other wall at a first distance and with a second recessed region adjacent said first region and formed with a pair of flanks diverging from the other side wall toward the respective one of said trailing and leading edges of the body and having a nadir located at a second distance from the other wall, said second distance being greater than said first distance;
first and second end walls spaced axially apart and extending between said side walls;
an inset member mounted on said pin in said recess and being formed with:
a first side face and a second side face confronting said first and second side walls of said recess, a first end face and a second end face juxtaposed respectively with said first and second end walls of said recess, and
an outer limiting face bridging said side and end faces, said side faces of said insert member being complementary with said side walls of said recess and said outer limiting face lying in said envelope of the body upon introducing said member into said recess.

8. The flow machine defined in claim 7 wherein one of said end walls of said recess lies in said envelope of said body.

9. The flow machine defined in claim 7 wherein at least one of said side faces is formed with a first and second zone juxtaposed with the respective one of said first and second region, said zones extending axially at an identical length, said first region extending axially at a length equal to said length of the zones, said second region having a length at least equal to said length of the zones.

10. A flow machine comprising:
a shaft rotatable about an axis of rotation;
at least one support arm mounted nonrotatably on said shaft and extending from said axis, said arm being formed with a free end spaced from said shaft;
at least one pin operatively connected with said free end and having a pivot axis rotatable about said axis of rotation;
a surface formed by a straight line generatrix moved about an airfoil shape closed path around said pivot axis;
a body formed with said surface and having a longitudinal axis coplanar with said pivot axis and pivotal about said pivot axis, said surface forming an envelope of said body defining:
a leading edge and a trailing edge, and
an inner envelope face facing said shaft and an outer envelope face opposite said inner envelope face, said envelope faces extending between said leading and trailing edges, said body being formed with an elongated recess opening at said inner envelope face and receiving said pin, said recess being spaced between said edges and being formed with:
a first and second side walls spaced from one another and extending from said inner envelope face toward said outer envelope face, at least one of said side walls being recessed and having a nadir located at a distance from the respective one of said trailing and leading edges of said body;
first and second end walls spaced axially from one another and extending between said side walls, said envelope faces being formed with respective axial openings extending from said first and second end walls;
an insert member mounted on said pin in said recess and formed with:
a first side face and a second side face confronting said first and second side walls of said recess,
a first end face and a second end face spaced axially apart, said first and second end faces being juxtaposed respectively with said first and second end walls of said recess,
an outer limiting face bridging said side and end faces and lying in said envelope of the body, and
a pair of engaging plates formed with respective flanges received by said axial openings formed in said envelope faces of the blade, each of said engaging plates being operatively connected with the respective one of said end faces of said insert member, so that said insert member is axially fixed upon inserting thereof in said recess.

* * * * *